(12) United States Patent
Caillot et al.

(10) Patent No.: US 12,103,500 B2
(45) Date of Patent: Oct. 1, 2024

(54) WIPER BLADE HAVING SECURE MEANS FOR LOCKING TO A DRIVE ARM, AND WIPER ASSEMBLY HAVING SUCH A WIPER BLADE

(71) Applicant: Valeo Systèmes d'Essuyage, Le Mesnil Saint Denis (FR)

(72) Inventors: Gérald Caillot, Le Mesnil Saint Denis (FR); Jean-Michel Jarasson, Le Mesnil Saint Denis (FR); Vincent Izabel, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 18/018,186

(22) PCT Filed: Jul. 13, 2021

(86) PCT No.: PCT/EP2021/069539
§ 371 (c)(1),
(2) Date: Jan. 26, 2023

(87) PCT Pub. No.: WO2022/023033
PCT Pub. Date: Feb. 3, 2022

(65) Prior Publication Data
US 2023/0264659 A1 Aug. 24, 2023

(30) Foreign Application Priority Data

Jul. 27, 2020 (FR) ........................................ 2007921

(51) Int. Cl.
*B60S 1/38* (2006.01)
*B60S 1/34* (2006.01)
(Continued)

(52) U.S. Cl.
CPC ........... *B60S 1/3862* (2013.01); *B60S 1/3415* (2013.01); *B60S 1/4048* (2013.01); *B60S 1/524* (2013.01);
(Continued)

(58) Field of Classification Search
CPC .... B60S 1/3415; B60S 1/3862; B60S 1/4038; B60S 1/4045; B60S 1/4048; B60S 1/524;
(Continued)

(56) References Cited

U.S. PATENT DOCUMENTS 8,719,994 B2 * 5/2014 Thienard ............... B60S 1/4038
15/250.32
2013/0291329 A1 11/2013 Izabel
(Continued)

FOREIGN PATENT DOCUMENTS

FR 2962094 A1 1/2012
FR 3034385 A1 10/2016
(Continued)

OTHER PUBLICATIONS

Machine translation of description portion of WO 2018/050326, published Mar. 2018. (Year: 2018).*
(Continued)

*Primary Examiner* — Gary K. Graham
(74) *Attorney, Agent, or Firm* — Osha Bergman Watanabe & Burton LLP (57) ABSTRACT

A wiper blade (12) is disclosed having a support connector (18) for at least one wiper rubber (14), an adapter (20) that is able to take a front-end terminal part (10) of a drive arm of the wiper blade (12) which is mounted so as to be articulated with respect to the connector (18), about an articulation axis (A), between a working position and a maintenance position, and which has a locking member (32) for locking said terminal part (10) to the adapter (20), which (Continued)

is mounted so as to be movable between a locking position and a retracted position releasing said terminal part (10). The wiper blade (12) has a member (68, 38) for immobilizing the locking member (32) in the locking position when the adapter (20) is in the working position, and for releasing the locking member (32) when the adapter (20) is in the maintenance position.

9 Claims, 6 Drawing Sheets

(51) Int. Cl.
  *B60S 1/40* (2006.01)
  *B60S 1/52* (2006.01)
(52) U.S. Cl.
  CPC ...... *B60S 1/3805* (2013.01); *B60S 2001/4051* (2013.01); *B60S 2001/4054* (2013.01)
(58) Field of Classification Search
  CPC ............ B60S 1/3805; B60S 2001/4051; B60S 2001/4054
  USPC .......................................... 15/250.32, 250.04
  See application file for complete search history.

(56) References Cited

U.S. PATENT DOCUMENTS

| | | |
|---|---|---|
| 2013/0298346 A1 | 11/2013 | Bousset et al. |
| 2016/0001746 A1* | 1/2016 | Scholl .................. B60S 1/4048 15/250.33 |
| 2018/0086315 A1* | 3/2018 | Houssat ................ B60S 1/4048 |

FOREIGN PATENT DOCUMENTS

| | | |
|---|---|---|
| JP | 2013544213 A | 12/2013 |
| WO | 2012/072301 A1 | 6/2012 |
| WO | 2012/072302 A1 | 6/2012 |
| WO | 2012/072748 A1 | 6/2012 |
| WO | 2018/050326 * | 3/2018 |

OTHER PUBLICATIONS

Machine translation of description portion of WO 2012/072302, published Jun. 2012. (Year: 2012).*
International Search Report and Written Opinion issued in corresponding International Application No. PCT/EP2021/069539, mailed on Sep. 29, 2021 (11 pages).
Office Action issued in counterpart Japanese Application No. 2023-505770, dated Feb. 2, 2024 (12 pages).

* cited by examiner

WIPER BLADE HAVING SECURE MEANS FOR LOCKING TO A DRIVE ARM, AND WIPER ASSEMBLY HAVING SUCH A WIPER BLADE

TECHNICAL FIELD OF THE INVENTION

The invention relates to a wiper blade and to an arm/wiper blade assembly comprising means for securing the connection between the arm and the wiper blade.

TECHNICAL BACKGROUND OF THE INVENTION

A motor vehicle is conventionally equipped with wipers, notably for cleaning the exterior surface of the windshield and thereby avoiding disruption to the driver's view of his surroundings.

A windshield wiper generally comprises a drive arm (also referred to as wiper arm or wiper carrier) that effects a, notably angular, back-and-forth movement, and a longitudinally elongate wiper blade that bears a wiper strip or blade rubber made of a resilient material such as rubber or an elastomer material.

The blade rubber rubs against the exterior surface of the windshield and evacuates the water by removing it from the driver's field of view.

In a conventional version, the wiper blade is produced in the form of articulated brackets which retain the wiper rubber at several discrete locations that are distributed longitudinally, conferring a bend thereon that allows it to closely follow any curvature of the windshield.

In a more recent version known as "flat blade", the wiper blade is produced in the form of a semi-rigid assembly which holds the blade rubber along its entire length by virtue of one or more bending vertebrae that make it possible to press the blade and the blade rubber against the windshield without having to use brackets.

In both designs, the wiper blade is joined to the drive arm by a connection system having a complementary connector and adapter.

The connector is a piece which is rigidly secured to the wiper blade and which is generally fastened directly to the blade rubber or to the flat blade, whereas the adapter is rigidly secured to the drive arm.

The adapter is an intermediate part which allows the connector to be joined and fastened to the drive arm. It is generally configured to be inserted into a head or end piece, in the form of a yoke and having an inverted-U-shaped cross section, of the drive arm.

Each of these two components (connector and adapter) comprises articulation means designed to cooperate with complementary means of the other component so as to define at least one transverse axis of articulation of the two components with respect to one another, which is also the axis of articulation of the wiper blade with respect to the drive arm.

In one configuration known in the art, one of the components, such as the connector, generally comprises a substantially cylindrical physical pin which defines the axis of articulation and is received in a housing of complementary shape in the other component.

The adapter generally has an elongate body which is configured to be inserted into the front free end piece of the drive arm such that this body extends at least in part between two substantially parallel side walls of this end piece.

An adapter makes it possible to join a wiper blade to a particular type of end piece. In the case of the abovementioned end pieces having an inverted-U-shaped cross section, there are several varieties thereof.

A drive arm with its head or front end piece mounted to slide in longitudinal translation longitudinally between a first front position or advanced position, referred to as the working or use position of the windshield wiper in which it is mounted and locked on the adapter, and a second rear position or retracted position, referred to as the maintenance or service position in which it is unlocked in order to allow dismantling or separation of the windshield wiper arm, for example with a view to replacing it, is also known.

Different types of adapters are known, and among these, some comprise, at the end of a flexible tab, a locking button adapted to be received in an opening of corresponding size formed in the free end piece of the drive arm.

When the drive arm is attached to the adapter, the flexible tab is typically aligned along a longitudinal direction parallel to which the drive arm primarily extends.

After insertion of the adapter into the free end piece of the drive arm, the locking button occupies a locking position in which it is engaged in the opening.

This attachment by interaction between the locking button and the opening contributes to the positioning and reliable fixing of the adapter relative to the drive arm, in particular both ways in the longitudinal direction.

To disengage the adapter from the drive arm, the user must press the locking button down into the opening for the locking button to reach a retracted release position to allow rearward sliding in the longitudinal direction of the drive arm.

In use, when the blade rubber is in contact with the exterior surface of the glass to be wiped and the wiper blade is driven in an alternating sweeping movement by the drive arm, the adapter pivots both ways about the axis of articulation with respect to the connector in a range of angular positions which is for example between plus or minus ten angle degrees (+/−10°) with respect to a reference "zero" position.

With a view to maintenance and for example to replace the wiper blade, it is known practice to raise the drive arm for the wiper blade, relative to the surface of the glass to be wiped, into the maintenance position, performing a rotation of approximately 90°, then to pivot the wiper blade into an angular position, falling within a range of angular maintenance positions adjacent to the range of angular working positions.

With respect to the reference zero angular position, the angular maintenance range is for example greater than +10° and less than +20°, for example.

In such a maintenance or service position, the user can press the locking button and separate the wiper blade from the end piece of the drive arm.

In use, it is particularly important, for operating safety, that the adapter does not become separated from the end piece of the drive arm.

However, for example due to differences in size between the components and the flexibility of the plastic parts, accidental separation has occurred.

The invention aims to propose a solution to this problem.

By way of non-limiting example, the invention is particularly applicable when the wiper blade comprises an assembly for hydraulic and/or electrical connection of the wiper blade carried by the connector.

To be specific, windshield wipers may be equipped with devices for supplying a windshield washer liquid which is supplied from a tank located on the vehicle and which is sprayed in the direction of the windshield by sprayers located on the windshield wiper itself for improved distribution of the liquid. In the case of nozzles positioned on the blades, the windshield washer liquid is conveyed, before being distributed to the nozzles, by one or more tubes which are attached to the windshield wiper drive arm and which are connected to the distribution system of the wiper blade at the connector. The connector thus comprises holes adapted to receive, with a sealed connection, the tips of said tubes.

There are also windshield wiper heating devices to thaw the blade in the event of extreme cold and prevent it from sticking to the windshield due to frost.

These devices, which are more specifically adapted to "flat blade" wipers, generally comprise a heating device integrated in the assembly bearing the blade rubber. They also require an electrical connection device, positioned at the connector, to transmit the electric current coming from the vehicle to the heating device.

All of these elements must be connected when a user needs to change their wiper blades.

To simplify the operations to be carried out during this replacement, an assembly for hydraulic and/or electrical connection to a wiper blade connector which is easy to fit, even for an inexperienced user, has thus been proposed.

Such a design of a connection assembly along with a number of improvements are illustrated in particular in documents WO-A1-2012/072748, FR-A1-2 962 094 and FR-A1-3 034 385.

BRIEF SUMMARY OF THE INVENTION

The invention proposes a wiper blade, comprising:
a connector for supporting at least one blade rubber;
an adapter capable of receiving a front end piece of a drive arm for the wiper blade which:
  is mounted articulated with respect to the connector, about an axis of articulation, between a working position and a maintenance position;
  comprises a member for locking said end piece on the adapter, which is mounted to move between a locking position and a retracted release position for locking/releasing said end piece;
characterized in that the wiper blade comprises a member for blocking the locking member in the locking position when the adapter is in the working position, and for releasing the locking member when the adapter is in the maintenance position.

According to other features of the wiper blade:
the locking member is mounted to move relative to the adapter, in a direction orthogonal to said axis of articulation, between the locking position and the retracted release position; and
the blocking member comprises a stop member, carried by the connector or by the locking member, which extends facing an abutment surface, carried by the locking member or by the connector, respectively;
the stop member is a protruding member carried by the connector or by the locking member, which extends facing an abutment surface, carried by the locking member or by the connector, respectively;
the wiper blade comprises a hydraulic and/or electrical connection assembly for the wiper blade which is carried by the connector, and the stop member is carried by the connection assembly or by the locking member and extends facing an abutment surface, carried by the locking member or by the connection assembly, respectively;
the hydraulic and/or electrical connection assembly comprises a front part rigidly secured to the connector, and a removable rear part which is mounted to move longitudinally with respect to said front part, in a direction orthogonal to said axis of articulation, between a front connected position that it occupies when said end piece is in the working position, and a rear disconnected position that it occupies when said end piece is in the maintenance position;
the stop member is a stop finger which is carried by said rear part and which extends facing an abutment surface carried by the locking member;
the locking member rigidly secured to the adapter comprises a flexible tab at the end of which is provided a locking button configured to be housed in a window provided in the end piece.

The invention also proposes an assembly comprising a front end piece of a drive arm and a wiper blade as described above wherein the removable rear part of the hydraulic and/or electrical connection assembly is releasably connected to a guide body carried by said end piece in such a way as to be rigidly secured thereto when the adapter is in the maintenance position and to be separated therefrom when the adapter is in the working position.

This assembly further comprises a sub-assembly comprising said end piece, said guide body and said removable rear part, which is adapted to be separated from the wiper blade comprising the connector, the adapter and said front part of the hydraulic and/or electrical connection assembly when the adapter is in the maintenance position and the locking member is in the retracted release position.

BRIEF DESCRIPTION OF THE FIGURES

Further features and advantages of the invention will become apparent from reading the following detailed description, for an understanding of which reference will be made to the appended drawings, in which.

DETAILED DESCRIPTION OF THE FIGURES

In the rest of the description, elements having an identical structure or similar functions will be denoted by the same references.

In the rest of the description and in the claims, longitudinal, vertical, transverse, side, front and rear orientations, indicated by the trihedron "L,V,T" in the figures, will be used in a non-limiting manner. A horizontal plane that extends longitudinally and transversely is also defined.

The vertical orientation is defined without reference to the earth's gravity.

The longitudinal axis L is by definition oriented from the rear to the front.

The transverse axis T is by definition oriented from left to right.

The terms lower, upper, bottom, top, etc. will be used with reference to the vertical orientation defined by the axis V.

Figure 1:
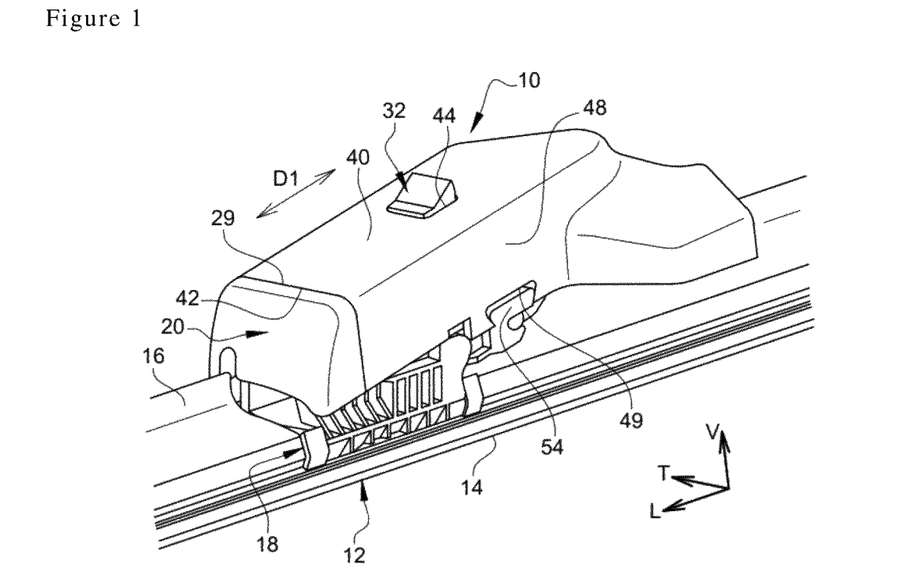
FIG. 1 is a perspective view which shows an assembly comprising a central portion of a wiper arm according to the invention which is depicted in association with the front end piece of a drive arm of the wiper blade.

FIG. 1 shows a front end piece 10, generally in the form of a yoke of inverted U shape, which belongs to a drive arm (not shown) for a windshield wiper.

The end piece 10 extends overall in a longitudinal direction D1 and it delimits an internal housing open longitudinally toward the front which is designed to receive an adapter for a wiper blade 12, a central portion of which is depicted in FIG. 1 in the position in which it is assembled and mounted in the end piece 10.

The wiper blade 12 comprises, in known manner, a blade rubber 14 which is associated with stiffening means and in this case, without limitation, with an upper part 16 in the form of an aerodynamic spoiler.

Between two longitudinal portions of the aerodynamic spoiler 16, the upper part of the blade rubber and of these reinforcement means is rigidly secured to a connector 18 which is a molded plastic part. Alternatively, the connector may be made of metal.

In a known manner, the connector 18 is associated with an adapter 20 complementary to the end piece 10.

Figure 9:
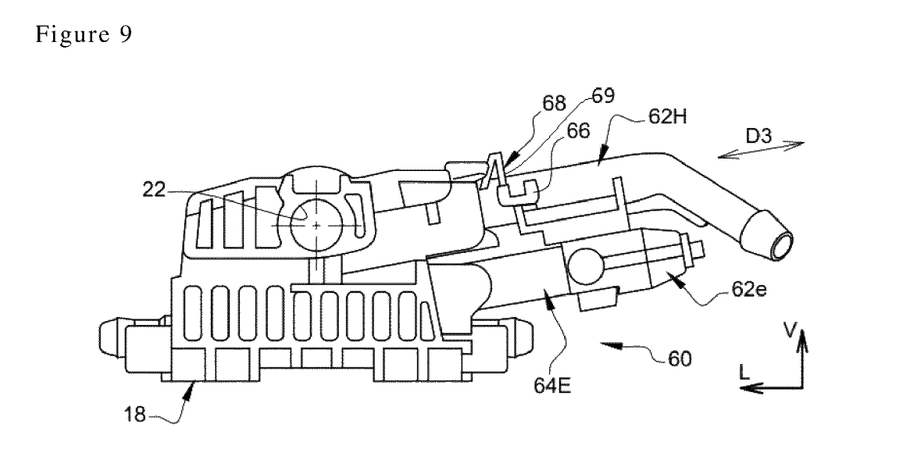
FIG. 9 is a side view which depicts the components of the hydraulic and electrical connection assembly which are depicted in the connected position of their front and rear parts.

As can be seen in particular in FIG. 9, the connector 18 comprises, in its upper part, two transversely opposite portions 22 of an axial bore which are complementary to two hinge rod portions (not visible in the figures) formed, in known manner, in the internal faces of the vertical side walls 24 of the adapter 20.

Thus, in the assembled position of the adapter 20 on the connector 18, these two components are mounted articulated relative to one another about a transverse axis of articulation "A" allowing the adapter 20 to pivot in both directions with respect to the connector 18, the latter being considered as a fixed reference in the context of the present description.

In known manner, the adapter 20, of U-shaped section, comprises two vertical side walls 24 and a horizontal upper wall 26 which, with a transverse vertical front face 28 delimits an internal housing in which the upper part of the connector 18 is received in particular.

At its rear longitudinal end, the horizontal upper wall 26 is extended by a flexible tab 30, molded in one piece, which is elastically deformable and which, at its rear free end, is extended by a locking member corresponding to a locking button 32.

The locking button 32 is delimited longitudinally toward the rear by a front vertical transverse face 33 and by a rear vertical transverse face 34.

The locking button 32 is also delimited vertically toward the bottom by a lower face substantially parallel to the plane in which the flexible tab 30 extends and in which is formed, in this case, a recess 36 which is delimited vertically toward the top by a flat end wall 37 and laterally by a front face and a rear face 38.

The end piece 10 in the form of a yoke comprises a horizontal upper back 40 which is delimited longitudinally toward the front by a front transverse edge 42 which, in the assembled position mounted on the adapter 20, is in abutment longitudinally toward the front against a facing rear transverse edge 29 of the upper wall 26 of the adapter 20.

Figure 3:
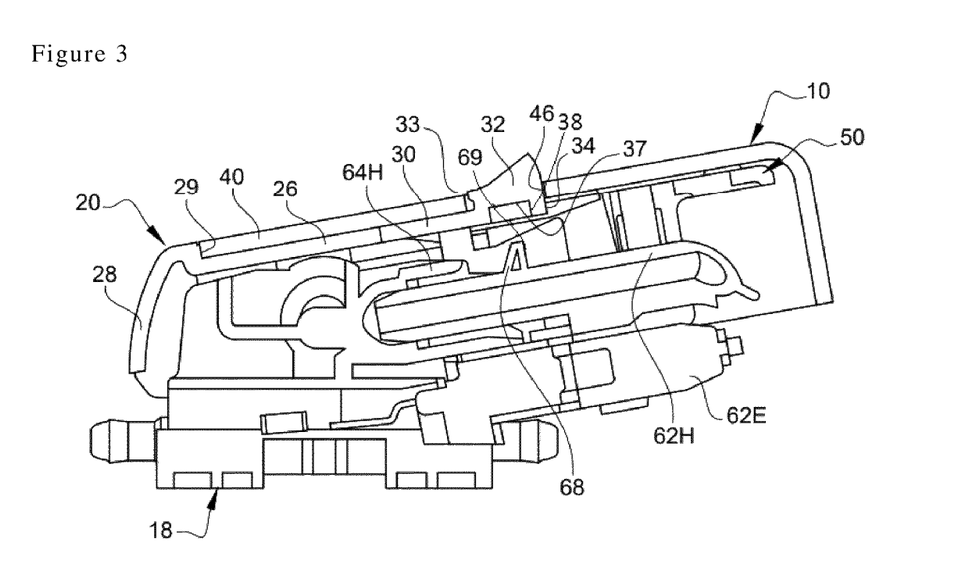
FIG. 3 is a view in cross section through a vertical and longitudinal mid-plane of the components depicted in FIG. 2.
Figure 7:
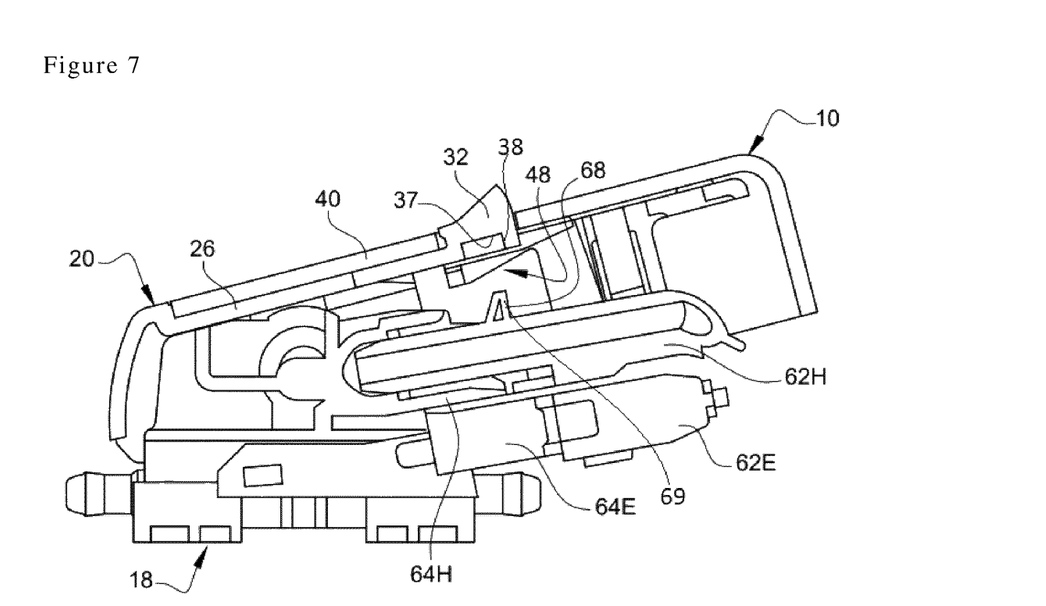
FIG. 7 is a view in cross section through a vertical and longitudinal mid-plane of the components depicted in FIG. 6.

The horizontal upper back 40 also includes an opening or a window 44 the contour and dimensions of which are complementary to those of the locking button 32 so that, as shown in particular in FIG. 1, 3 or 7, it can receive the locking button 32. In such a position, the locking button 32 blocks in both directions—in longitudinal sliding in the direction D1 relative to the end piece 10 of the drive arm—the adapter 20 on the end piece 10 of the drive arm.

The end piece 10 in the form of a yoke also comprises two opposite side flanges 48, each of which extends in a vertical longitudinal plane.

Figure 11:
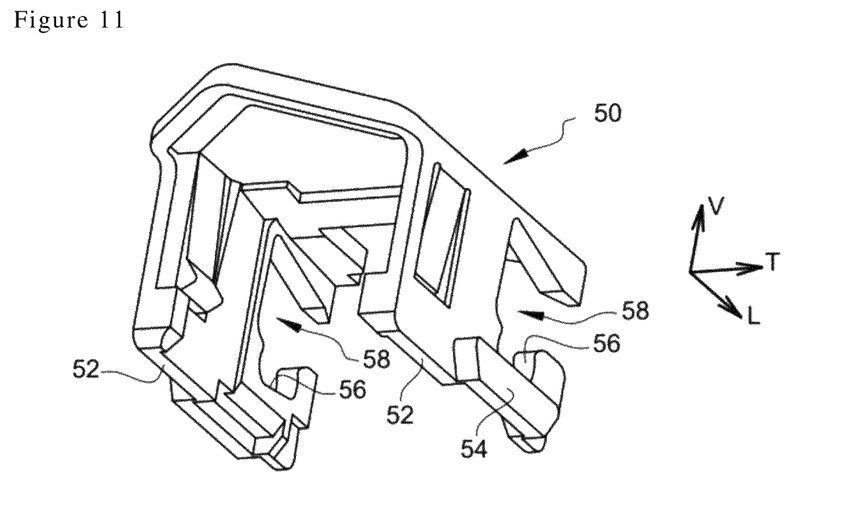
FIG. 11 is a perspective view of the guide element carried by the front end piece of the drive arm.

Between the opposite internal faces of its flanges 48, in the vicinity of its rear end portion, the end piece 10 houses internally a guide body 50 which is in particular depicted in detail in FIG. 11.

The guide body 50 is a molded plastic part, also in the general shape of a yoke, the dimensions of which are complementary to the internal dimensions of the rear end portion of the end piece 10.

The guide body 50 comprises in particular two opposite side flanges 52, each of which extends in a vertical longitudinal plane.

The guide body 50 is housed and secured in the end piece 10 in particular by means of two lugs 54, each of which is formed in the vicinity of the lower edge of a flange 52 and extends transversely outwards to be received by fitting elastically in a complementary notch 49 formed in a lower edge of an associated side flange 48 of the end piece 10.

Thus, the guide body 50 is always rigidly secured to the end piece 10 in its various movements and displacements and in particular in longitudinal sliding both ways in the direction D1 with respect to the adapter 20 and in pivoting both ways about the axis of articulation A when the end piece 10 is rigidly secured to the adapter 20.

In each of its side flanges 52, the guide body 50 comprises a notch 56 which is open vertically toward the top into a window 58 which is itself open longitudinally toward the front.

In a known manner, and for example according to the teachings of document WO-A1-2012/072748, the wiper blade comprises an assembly 60 of means for hydraulic and electrical connection of the wiper blade.

In the assembled position of the elements and components of the windshield wiper and in the state of use of the windshield wiper, this assembly forms a whole which is carried by the connector and which is shown in particular in FIG. 9.

For the hydraulic connection, the assembly comprises a removable "male" rear part 62H which is connected to a "female" front part 64H which is in this case integrated in the body of the connector, these two parts being in this case designed, in a non-limiting manner, to establish a "central" hydraulic path.

For the electrical connection, the assembly comprises a removable "male" rear part 62E which is connected to a "female" front part 64E which is carried by the body of the connector 18, these two parts being in this case designed, in a non-limiting manner, to establish two power lines.

The various parts are shown in their "connected" state or relative position, the rear parts 62H and 62E occupying a front position with respect to the body of the connector 18 and the front parts 64H and 64E carried by same.

The assembly is designed to be able to be disconnected, in the longitudinal direction "D3", by simultaneously driving the two rear parts 62H and 62E longitudinally rearward into a disconnected rear position (not shown in the figures).

To this end, the rear hydraulic connection part 62H is rigidly secured in longitudinal translation along D3 to the rear electrical connection part 62E.

Depending on the angular position of the end piece 10 with respect to the connector 18, and as will be explained below, the rear hydraulic connection part 62H is rigidly secured or not in longitudinal translation along D1 to the guide body 50 connected to the end piece 10.

Figure 10:
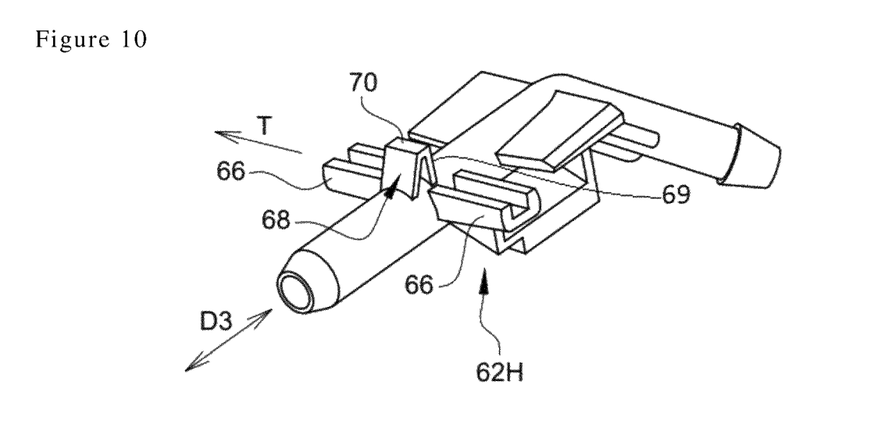
FIG. 10 is a perspective view of the rear hydraulic connection part of the assembly shown in FIG. 10.

For this purpose, and as can be seen in particular in FIG. 10, the rear hydraulic connection part 62H comprises two opposite transverse studs 66, each of which has a contour complementary to that of an associated notch 56 in the guide body 50.

Figure 2:
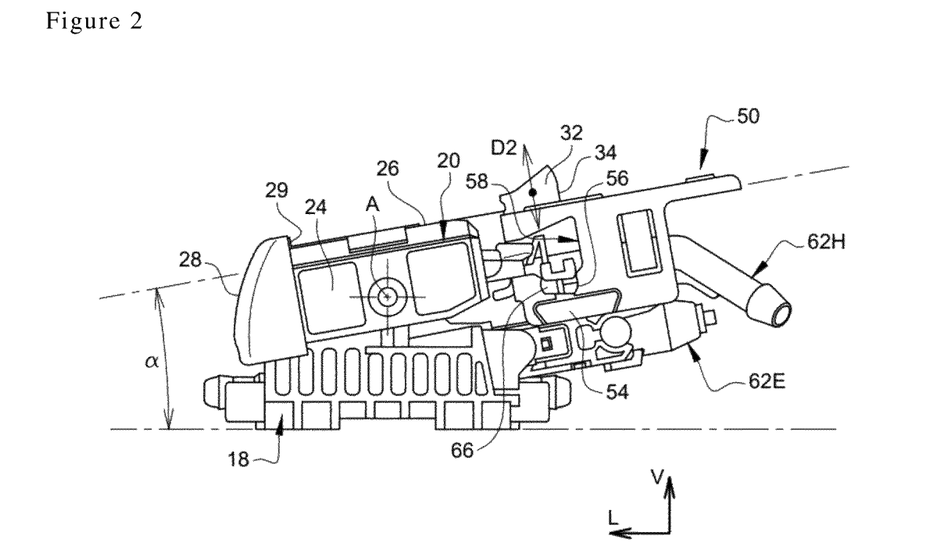
FIG. 2 is a side view of the assembly of FIG. 1 which is depicted without the end piece of the drive arm and without the blade rubber, in a working position of the adapter relative to the connector, and in a locking position of the locking button.
Figure 6:
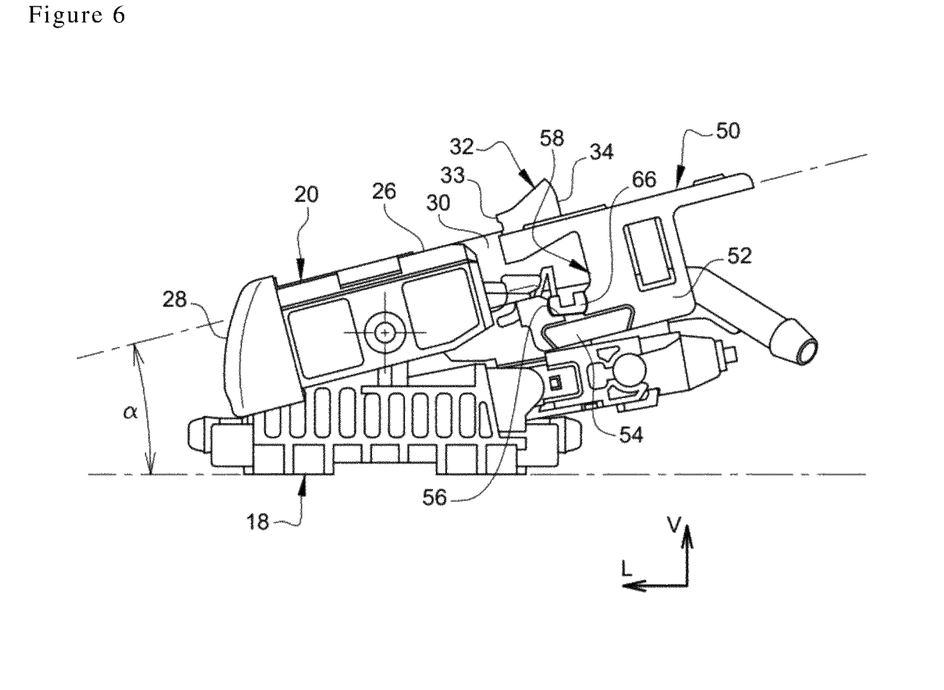
FIG. 6 is a side view of the assembly of components shown in FIG. 5.

Thus, depending on the angular position of the end piece 10 with respect to the connector 18 and as shown for example in FIGS. 2 and 6, each stud 66 can be fitted, or not, in an associated notch 56.

According to the invention, provision is made for a member for blocking the locking button 32 in the locking position when the adapter is in the working position, and in the retracted release position for releasing the locking button when the adapter is in the angular maintenance position.

The purpose of the blocking member is to oppose sufficient downward movement in the direction D2 of the locking button to prevent it from reaching its retracted release position allowing longitudinal sliding of the end piece 10.

The blocking member is in this case a stop finger 68 which is carried by the connector 18.

More specifically, the stop finger 68 is in this case carried by the upper face of the rear hydraulic connection part 62H and is arranged substantially in line with the transverse studs 66.

The stop finger 68 is delimited vertically toward the top by an upper facet 70 and laterally by a front side face and a rear side face 69.

As will be explained below, depending on the relative angular position of the components, the stop finger 68 may or may not be received in the recess 36 formed in the locking button 32 facing the surface 38 which constitutes the abutment surface capable of interacting with the rear side face 69 of the stop finger 68. The abutment surface 38 corresponds to the rear side face delimiting the recess 36 in the locking button.

The assembly which has just been described functions as follows. Taking the connector 18 as geometric reference, the angular position of the adapter 20 is defined with respect to the connector 18 according to the value of the angle "alpha" shown in particular in FIGS. 2 and 6.

When the upper dotted line defining the angular position of the adapter 20 is horizontal, that is to say parallel to the horizontal lower line of the connector 18, the value of the angle alpha is equal to zero.

In FIG. 2, the adapter 20 and the end piece 10 shown in FIG. 1 are in the working position corresponding for example to a value of the angle alpha equal to approximately 10°.

In this working position, and in each of the working positions, the studs 66 are located outside the notches 56 and move freely, generally in the direction D2 inside the windows 58.

As can be seen in FIG. 3, the end piece 10 is locked on the adapter 20 by the locking button 32 which is housed inside the central window 44 in the end piece 10, into which position it is elastically returned by the tab 30.

To unlock and release the end piece 10, it is normally necessary to apply to the locking button 32 an unlocking force in the direction D2, from top to bottom, in order to disengage it completely from the central window 44 in the end piece 10.

Figure 4:
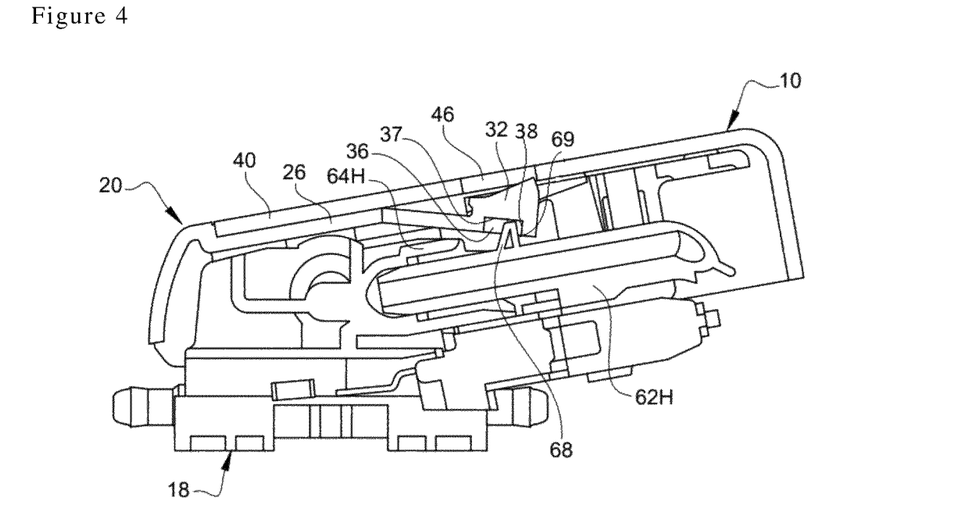
FIG. 4 is a view similar to that of FIG. 3 in which the locking button is shown in a locking position blocked by the blocking member according to the invention.
Figure 5:
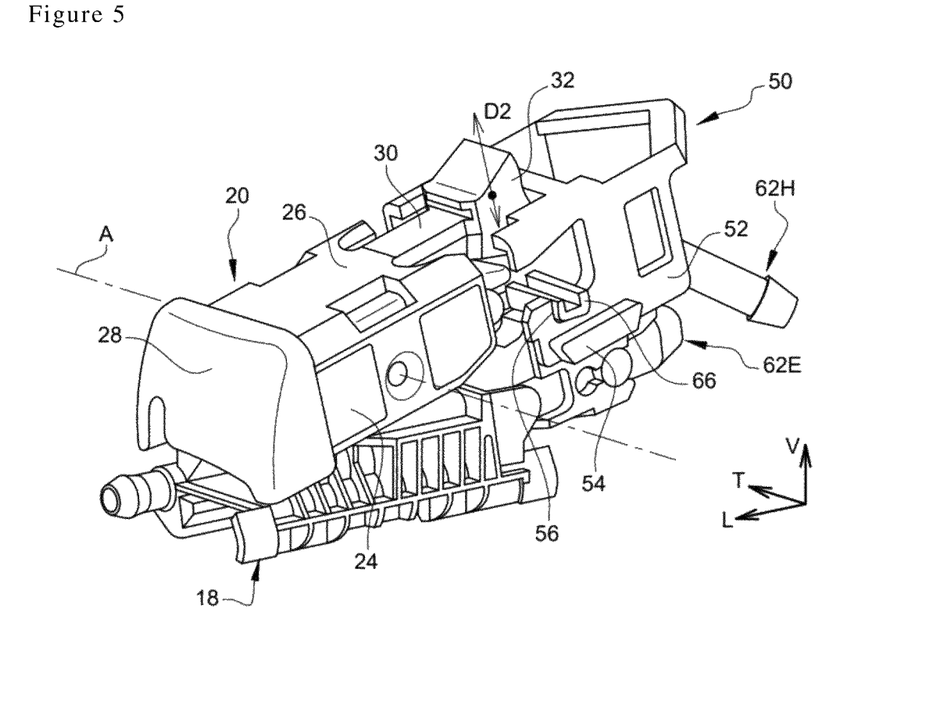
FIG. 5 is a perspective view of the assembly of components depicted in FIG. 2, in a maintenance position of the adapter relative to the connector, and in a locking position of the locking button.

As can be seen in FIG. 4, and thanks to the design according to the invention, as long as the adapter 20 is in a working position with respect to the connector 18, any action on the locking button 32 with a view to unlocking results in the abutment surface 38 of the locking button 32, corresponding to the rear side face delimiting the recess 36 in the locking button, coming into abutment against the rear side face 69 of the locking finger 68, thus preventing sufficient unlocking of the locking button 32 and thus opposing any accidental separation of the wiper blade 12 from the end piece 10 when the wiper blade 12 is in a working position.

In FIG. 6, the adapter 20 and the end piece 10 shown in FIG. 1 are in the service or maintenance position in which the value of the angle alpha is for example equal to approximately 14.5°.

Figure 8:
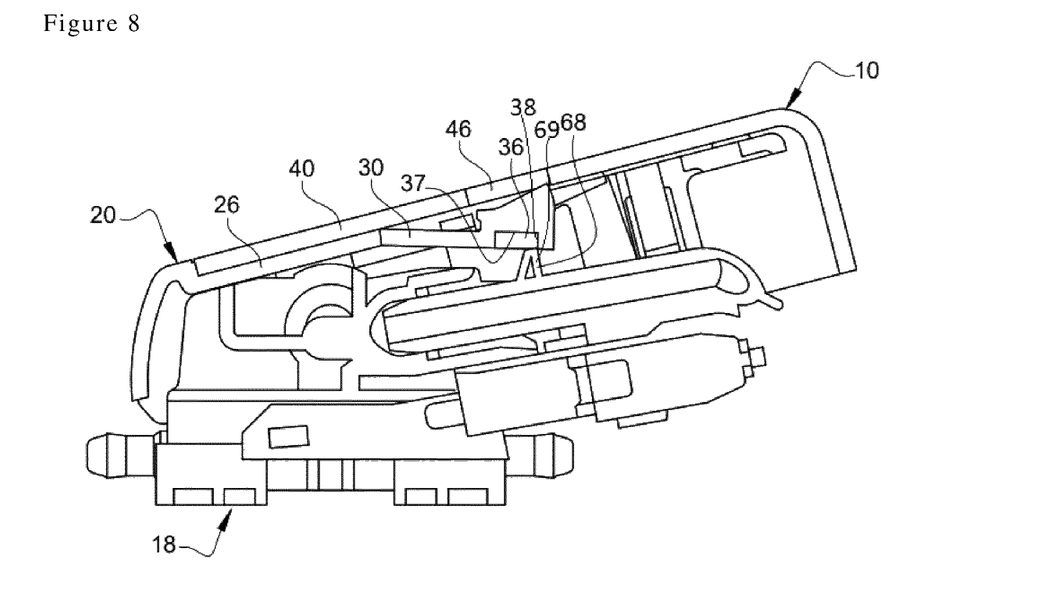
FIG. 8 is a view similar to that of FIG. 7 in which the locking button is shown in a retracted release position for releasing the end piece.

In this relative position which is shown in particular in FIGS. 6 to 8, the studs 66 are each engaged respectively in an associated notch 56 in the guide body 50 which is rigidly secured to the end piece 10.

Moreover, it is then possible to release the end piece 10 with respect to the wiper blade 12, and more particularly with respect to the adapter 20, by acting on the locking button 32 to cause it to come out of the central window 44 in the end piece 10 as shown in FIGS. 7 and 8, insofar as, in such a maintenance position corresponding to a value of the angle alpha of greater than 10° and in particular greater than 14.5°, the stop finger 68 never interacts with the facing abutment surface 38.

It is thus possible to separate the end piece 10 from the adapter 20 by sliding it longitudinally from front to rear in the direction D1 indicated in FIG. 1.

Owing to the presence of the studs 66 in the notches 56, any longitudinal force applied to the wiper blade 12 simultaneously drives the guide body 50 which itself drives, in longitudinal translation toward the rear, the rear hydraulic connection part 62H which itself simultaneously drives the rear hydraulic connection part 62E.

Thus, in the maintenance or service position, it is for example possible to replace the wiper blade 12 with a new wiper blade having automatically disconnected the rear hydraulic connection 62H and electrical connection 62E parts from the complementary front connection parts 64H and 64E.

In a known manner, the rear connection parts 62H and 62E are carried by the end piece 10 in an alignment position such that when fitting and assembling a new wiper blade, they will be connected to the complementary front connection parts 64H and 64E automatically and reliably.

The invention claimed is:

1. A wiper blade comprising:
a connector for supporting at least one blade rubber;
an adapter capable of receiving a front end piece of a drive arm for the wiper blade wherein the adapter:
  is mounted articulated with respect to the connector, about an axis of articulation, between a working position and a maintenance position;
  comprises a member for locking said end piece on the adapter, which is mounted to move between a locking position and a retracted release position for locking/releasing said end piece;
a member for blocking the locking member in the locking position when the adapter is in the working position, and for releasing the locking member when the adapter is in the maintenance position;
an elongated hydraulic and electrical connection assembly for the wiper blade which is carried by the connector, and wherein the member for blocking extends transversely to the connection assembly and comprises a stop member that is carried by the connection assembly and extends facing an abutment surface, carried by the locking member.

2. The wiper blade as claimed in claim 1, wherein:
the locking member is mounted to move relative to the adapter, in a direction orthogonal to said axis of articulation, between the locking position and the retracted release position.

3. The wiper blade as claimed in claim 2, wherein the hydraulic and electrical connection assembly comprises a front part rigidly secured to the connector, and a removable rear part which is mounted to move longitudinally with respect to said front part, in a direction orthogonal to said axis of articulation, between a front connected position that it occupies when said end piece is in its working position, and a rear disconnected position that it occupies when said end piece is in its maintenance position.

4. The wiper blade as claimed in claim 3, wherein the stop member is a stop finger which is carried by said rear part and which extends facing an abutment surface carried by the locking member.

5. An assembly comprising:
a front end piece of a drive arm and a wiper blade as claimed in claim 3,
wherein the removable rear part of the hydraulic and electrical connection assembly is releasably connected to a guide body carried by said end piece in such a way as to be rigidly secured thereto when the adapter is in the maintenance position and to be separated therefrom when the adapter is in the working position.

6. The assembly as claimed in claim 5, further comprising: a sub-assembly comprising said end piece, said guide body and said removable rear part, which is adapted to be separated from the wiper blade comprising the connector, the adapter and said front part of the hydraulic and electrical connection assembly when the adapter is in the maintenance position and the locking member is in the retracted release position.

7. The wiper blade as claimed in claim 2, wherein the locking member rigidly secured to the adapter comprises a flexible tab at the end of which is provided a locking button configured to be housed in a window provided in the end piece.

8. A wiper blade comprising:
a connector for supporting at least one blade rubber;
an adapter capable of receiving a front end piece of a drive arm for the wiper blade wherein the adapter:
  is mounted articulated with respect to the connector, about an axis of articulation, between a working position and a maintenance position; and
  comprises a member for locking said end piece on the adapter, which is mounted to move between a locking position and a retracted release position for locking/releasing said end piece;
a member for blocking the locking member in the locking position when the adapter is in the working position, and for releasing the locking member when the adapter is in the maintenance position; and
a hydraulic and electrical connection assembly for the wiper blade which is carried by the connector, and wherein a stop member is carried by one of the connection assembly or locking member and extends facing an abutment surface, carried by the other of the locking member or connection assembly, respectively,
wherein the locking member is mounted to move relative to the adapter, in a direction orthogonal to said axis of articulation, between the locking position and the retracted release position,
wherein the blocking member comprises the stop member,
wherein the hydraulic and electrical connection assembly comprises a front part rigidly secured to the connector, and a removable rear part which is mounted to move longitudinally with respect to said front part, in a direction orthogonal to said axis of articulation, between a front connected position that it occupies when said end piece is in its working position, and a rear disconnected position that it occupies when said end piece is in its maintenance position, and
wherein the stop member is a stop finger which is carried by said rear part and which extends facing an abutment surface carried by the locking member.

9. A wiper blade comprising:
a connector for supporting at least one blade rubber;
an adapter capable of receiving a front end piece of a drive arm for the wiper blade wherein the adapter:
  is mounted articulated with respect to the connector, about an axis of articulation, between a working position and a maintenance position; and
  comprises a member for locking said end piece on the adapter, which is mounted to move between a locking position and a retracted release position for locking/releasing said end piece;
a member for blocking the locking member in the locking position when the adapter is in the working position, and for releasing the locking member when the adapter is in the maintenance position; and
a hydraulic and electrical connection assembly for the wiper blade which is carried by the connector, and wherein a stop member is carried by one of the connection assembly or locking member and extends facing an abutment surface, carried by the other of the locking member or connection assembly, respectively,
wherein the hydraulic and electrical connection assembly comprises a front part rigidly secured to the connector, and a removable rear part which is mounted to move longitudinally with respect to said front part, wherein the stop member is a stop finger which is carried by said rear part and which extends facing an abutment surface carried by the locking member.

* * * * *